United States Patent
Kasuya

(10) Patent No.: US 9,159,118 B2
(45) Date of Patent: Oct. 13, 2015

(54) IMAGE PROCESSING APPARATUS, IMAGE PROCESSING SYSTEM, AND NON-TRANSITORY COMPUTER-READABLE MEDIUM

(71) Applicant: Yuuji Kasuya, Kanagawa (JP)

(72) Inventor: Yuuji Kasuya, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/177,725

(22) Filed: Feb. 11, 2014

(65) Prior Publication Data

US 2014/0233851 A1    Aug. 21, 2014

(30) Foreign Application Priority Data

Feb. 21, 2013    (JP) .................................. 2013-032365

(51) Int. Cl.
*G06T 3/40* (2006.01)
*G06K 9/00* (2006.01)

(52) U.S. Cl.
CPC .............. *G06T 3/40* (2013.01); *G06K 9/00228* (2013.01)

(58) Field of Classification Search
CPC ..... G06K 9/00268; G06T 3/40; H04N 5/2628
USPC ................. 382/195, 282, 283, 284, 199, 165; 348/231.99, 345, 620
See application file for complete search history.

(56) References Cited

U.S. PATENT DOCUMENTS

| | | | | |
|---|---|---|---|---|
| 7,035,456 | B2 * | 4/2006 | Lestideau | 382/164 |
| 7,209,149 | B2 * | 4/2007 | Jogo | 345/622 |
| 2001/0048447 | A1 * | 12/2001 | Jogo | 345/620 |
| 2005/0117049 | A1 * | 6/2005 | Suzuki | 348/345 |
| 2005/0180656 | A1 | 8/2005 | Liu et al. | |
| 2005/0198661 | A1 | 9/2005 | Collins et al. | |
| 2007/0065136 | A1 * | 3/2007 | Lakey | 396/287 |
| 2007/0206878 | A1 | 9/2007 | Liu et al. | |
| 2009/0087100 | A1 * | 4/2009 | Hu | 382/190 |
| 2009/0135269 | A1 * | 5/2009 | Nozaki et al. | 348/222.1 |
| 2009/0190835 | A1 * | 7/2009 | Lee | 382/190 |
| 2009/0316990 | A1 * | 12/2009 | Nakamura et al. | 382/173 |
| 2010/0201789 | A1 * | 8/2010 | Yahagi | 348/51 |
| 2010/0322519 | A1 | 12/2010 | Kasuya et al. | |
| 2010/0324946 | A1 | 12/2010 | Ohmura et al. | |
| 2010/0329550 | A1 * | 12/2010 | Cheatle | 382/165 |
| 2011/0075016 | A1 * | 3/2011 | Shimizu | 348/345 |
| 2011/0090246 | A1 * | 4/2011 | Matsunaga | 345/620 |

(Continued)

FOREIGN PATENT DOCUMENTS

| | | |
|---|---|---|
| JP | 2005-267611 | 9/2005 |
| JP | 2006-318151 | 11/2006 |

(Continued)

*Primary Examiner* — Mekonen Bekele
(74) *Attorney, Agent, or Firm* — Oblon, McClelland, Maier & Neustadt, L.L.P.

(57) ABSTRACT

An aspect of the present invention provides an image processing apparatus including: a people detecting unit that detects image portions of faces of a plurality of people in an image; and an image converting unit that enlarges a portion below a horizontal line segment of the image in a manner that locates the horizontal line segment at a top end of the enlarged image based on upper end positions of the detected faces. The horizontal line segment is on or above the extracted faces and has a lateral width equal to or larger than a lateral width of the faces. The image processing apparatus performs enlargement with reference to the faces so as not to warp the faces.

11 Claims, 9 Drawing Sheets

(56) References Cited

U.S. PATENT DOCUMENTS

| | | |
|---|---|---|
| 2011/0210908 A1 | 9/2011 | Kasuya et al. |
| 2011/0216222 A1 | 9/2011 | Niyagawa et al. |
| 2011/0221773 A1 | 9/2011 | Kasuya et al. |
| 2012/0014672 A1 | 1/2012 | Kasuya |
| 2012/0056975 A1 | 3/2012 | Yamashita et al. |
| 2012/0069045 A1 | 3/2012 | Hashimoto et al. |
| 2012/0113238 A1 | 5/2012 | Yamamoto et al. |
| 2012/0113255 A1 | 5/2012 | Kasuya et al. |
| 2012/0127323 A1 | 5/2012 | Kasuya et al. |
| 2013/0004064 A1* | 1/2013 | Yamaguchi .................. 382/164 |
| 2013/0063547 A1 | 3/2013 | Kasuya et al. |
| 2013/0129251 A1 | 5/2013 | Ishii et al. |
| 2013/0335369 A1 | 12/2013 | Nakatomi et al. |
| 2013/0339271 A1 | 12/2013 | Kasuya et al. |
| 2014/0019378 A1 | 1/2014 | Okuyama et al. |
| 2014/0176756 A1* | 6/2014 | Yoon .......................... 348/222.1 |
| 2014/0184849 A1* | 7/2014 | Kim .......................... 348/231.99 |

FOREIGN PATENT DOCUMENTS

| | | |
|---|---|---|
| JP | 2008-536238 | 9/2008 |
| JP | 2012-54907 | 3/2012 |
| JP | 2012-80518 | 4/2012 |

* cited by examiner

FIG.4A
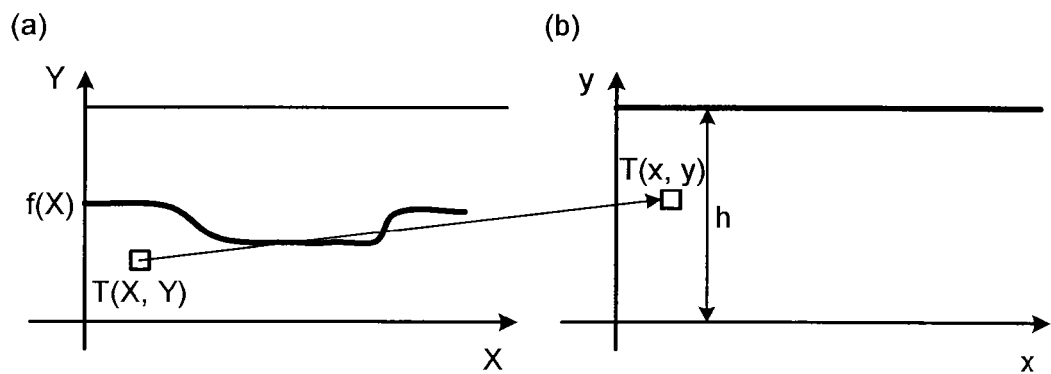
FIG.4B
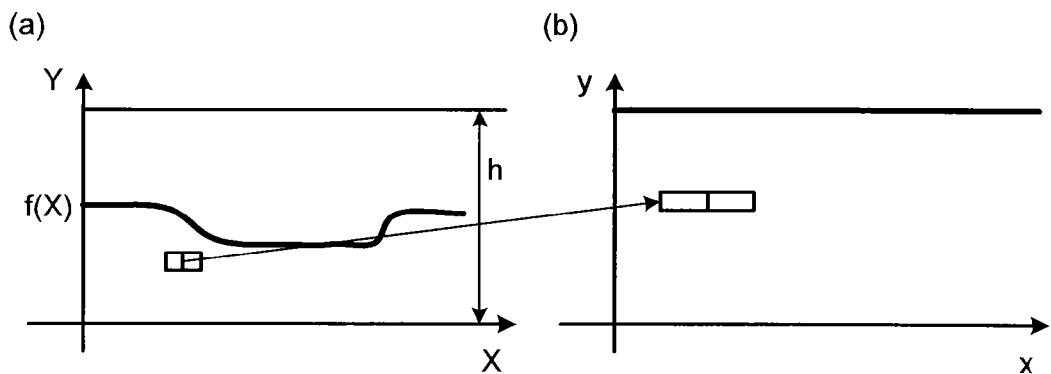
FIG.4C
T1(x, y)
| x | 0 | 1 | 2 | 3 | 4 | 5 | 6 | 7 |
|---|---|---|---|---|---|---|---|---|
| X | 0 | 0.5 | 0.7 | 1.1 | 1.3 | 2.0 | 2.2 | | n FRAMES

COUNT VALUE

CIRCUMSCRIBING RECTANGLE

TRIMMING

RESIZING

IMAGE PROCESSING APPARATUS, IMAGE PROCESSING SYSTEM, AND NON-TRANSITORY COMPUTER-READABLE MEDIUM

CROSS-REFERENCE TO RELATED APPLICATIONS

The present application claims priority to and incorporates by reference the entire contents of Japanese Patent Application No. 2013-032365 filed in Japan on Feb. 21, 2013.

BACKGROUND OF THE INVENTION

1. Field of the Invention

The present invention relates to an image processing apparatus, an image processing system, and a non-transitory computer-readable medium.

2. Description of the Related Art

Conventionally, in such a situation where a plurality of seated people are photographed by a camera or the like, there can be obtained an image, in which the people are away from the camera at varying distances, or an image, in which sizes of the people in an image vary greatly depending on location of the people in a view field of the camera. In that case, the people can be photographed in unequal sizes such that, for example, a face of one person is clear but a face of another person is indistinguishable. To alleviate such a problem, published Japanese translation of PCT application No. 2008-536238 discloses a technique of enlarging faces of people by continuously enlarging/reducing an image.

However, the conventional technique of enlarging/reducing an image is disadvantageous in being incapable of adapting to different arrangements of people. This is because the technique enlarges/reduces images using a fixed enlarging/reducing method. A technique of enlarging/reducing an image according to locations where people are seated can be employed. However, this technique is disadvantageous in that, when simple enlargement/reduction is performed, image portions of people and a background image portion are deformed discontinuously, resulting in a noticeably-unnatural image.

Therefore, it is desirable to provide an image processing apparatus capable of appropriately enlarging an image of a plurality of people.

SUMMARY OF THE INVENTION

It is an object of the present invention to at least partially solve the problems in the conventional technology.

According to an aspect of the present invention, there is provided an image processing apparatus including: a people detecting unit that detects image portions of faces of a plurality of people in an image; and an image converting unit that enlarges a portion below a horizontal line segment of the image in a manner that locates the horizontal line segment at a top end of the enlarged image based on upper end positions of the detected faces, the horizontal line segment being on or above the detected faces and having a lateral width equal to or larger than a lateral width of the faces.

According to another aspect of the present invention, there is provided an image processing system including: a people detecting unit that detects image portions of faces of a plurality of people in an image; and an image converting unit that enlarges a portion below a horizontal line segment of the image in a manner that locates the horizontal line segment at a top end of the enlarged image based on upper end positions of the detected faces, the horizontal line segment being on or above the detected faces and having a lateral width equal to or larger than a lateral width of the faces.

According to still another aspect of the present invention, there is provided a non-transitory computer-readable medium storing program codes that cause, when executed by a computer, the computer to perform a method including: detecting image portions of faces of a plurality of people in an image; and enlarging a portion below a horizontal line segment of the image in a manner that locates the horizontal line segment at a top end of the enlarged image based on upper end positions of the detected faces, the horizontal line segment being on or above the detected faces and having a lateral width equal to or larger than a lateral width of the faces.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4A is explanatory diagrams for enlarging an image in the y-axis direction in image conversion according to the embodiment;

FIG. 4B is explanatory diagrams for enlarging the image in the x-axis direction in the image conversion according to the embodiment;

FIG. 4C is a diagram illustrating an example of a conversion table of x coordinates and X coordinates for the image conversion according to the embodiment;

DETAILED DESCRIPTION OF THE PREFERRED EMBODIMENTS

Figure 1:
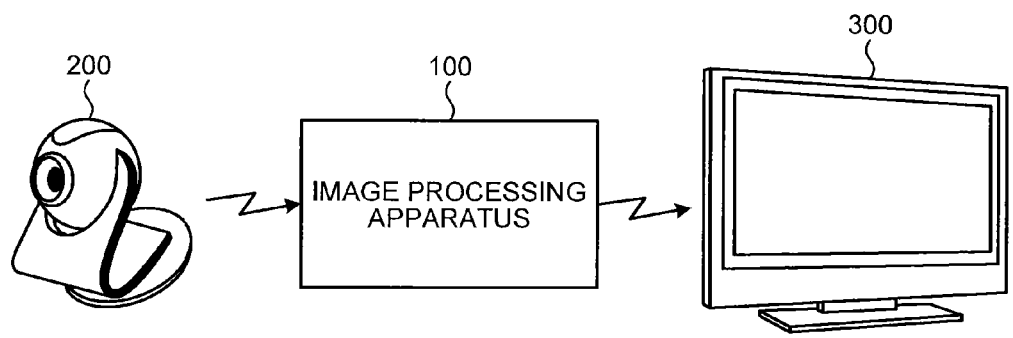
FIG. 1 is a diagram illustrating a configuration of a video conference system including an image processing apparatus according to an embodiment of the present invention.

An exemplary embodiment of the present invention is described in detail below with reference to the accompanying drawings. FIG. 1 is a diagram illustrating a configuration of a system including an image processing apparatus according to an embodiment of the present invention. An image processing apparatus 100 is connected to an image capturing unit 200 and a display apparatus 300. In this system, an image captured by the image capturing unit 200 is processed by the image processing apparatus 100, and thereafter displayed on the display apparatus 300. Example applications of such apparatuses include a video conference system. When used in a video conference system, the image processing apparatus 100 is connected over a network to the display apparatus 300 placed at another location, and an image processed by the image processing apparatus 100 is remotely displayed on the display apparatus 300. A one-piece configuration, in which an image capturing unit and a display apparatus are built in the image processing apparatus 100, can alternatively be employed.

Figure 2:
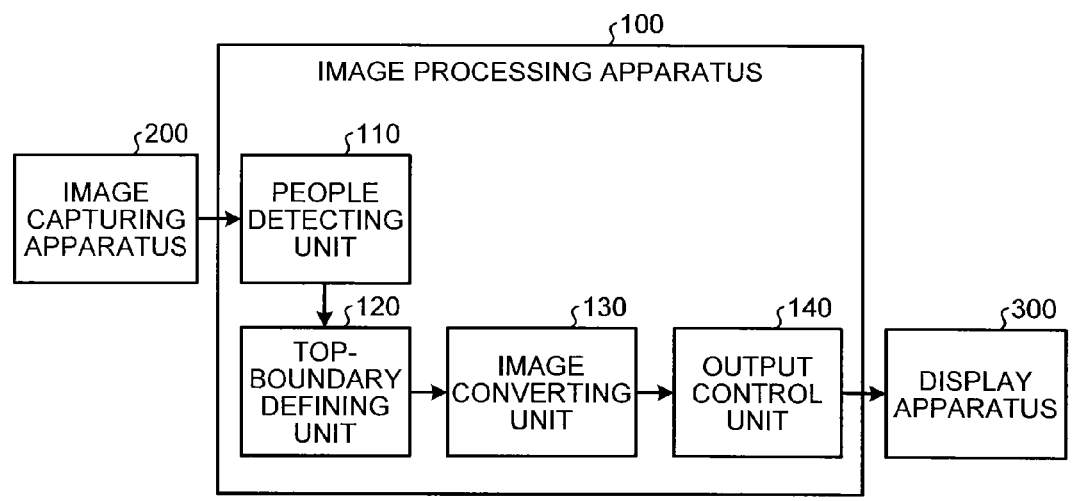
FIG. 2 is a block diagram illustrating a functional configuration of the video conference system including the image processing apparatus according to the embodiment.

FIG. 2 is a block diagram illustrating a functional configuration of the image processing apparatus 100. As illustrated in FIG. 2, the image processing apparatus 100 includes a people detecting unit 110, a top-boundary defining unit 120, an image converting unit 130, and an output control unit 140. These units may be implemented by program instructions or by hardware. Image data captured by the image capturing unit 200 is input to the image processing apparatus 100. Each pixel in the image data is denoted as P(x, y) using an x coordinate (coordinate in the horizontal direction) and a y coordinate (coordinate in the vertical direction). The people detecting unit 110 extracts faces of people from the input image data and identifies coordinates. Image data representing a face is characterized by: moving; having a skin color; having a texture of a facial front view or a texture of a facial side view. Accordingly, face detection can be achieved by using one or a combination of motion detection, skin-color detection, and face detection.

The top-boundary defining unit 120 determines top coordinates based on upper end positions of pixels that represent the extracted faces, generates lateral (i.e., horizontal) line segments extending from the top coordinates, and stores coordinates of pixels of the lateral line segments. The length of the horizontal line segment is set to a preset number (e.g., a number between 1.1 and 1.3) multiple of a lateral width of the face detected by the people detecting unit 110. The preset number is set so as not to make the predetermined number multiple of the facial lateral width larger than an overall lateral width of a body.

Figure 3A:
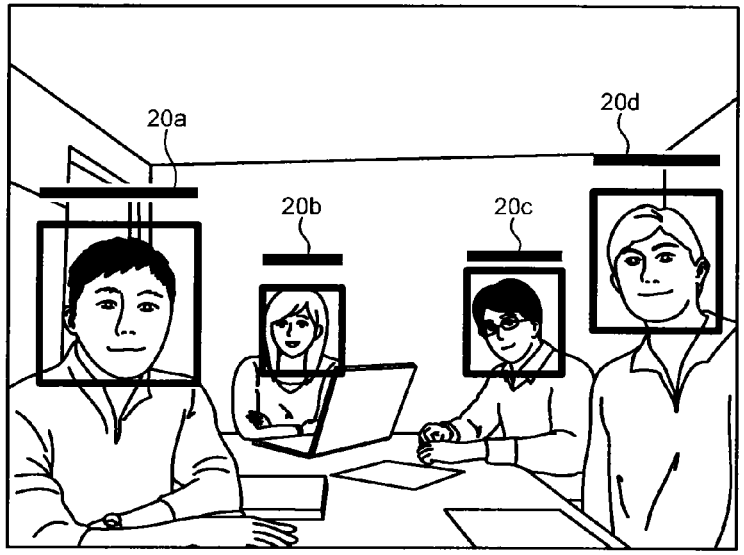
FIGS. 3A to 3C are diagrams illustrating stage by stage how an image is enlarged by the image processing apparatus according to the embodiment.

Let top pixels of pixels that represent a face of one person be denoted by $P(x_n, y_n)$, $P(x_{n+1}, y_{n+1})$, ..., $P(x_{n+m}, y_{n+m})$. In this case, coordinates of an uppermost pixel in an image of the face may be used as a top position; alternatively, mean coordinates of the pixels $P(x_n, y_n)$, $P(X_{n+1}, y_{n+1})$, ..., $P(x_{n+m}, y_{n+m})$ may be used as the top position; further alternatively, coordinates of a position a predetermined buffer distance above the uppermost coordinates may be used as the top position. The horizontal line segments each extending from the top coordinates used in this way and having the lateral width described above are generated. The horizontal line segments are not actually drawn in the image data but generated in a memory as data that is not to be displayed. In the example described below, it is assumed that the top coordinates are the coordinates of the position the predetermined buffer length above the uppermost coordinates. FIG. 3A illustrates a state where horizontal line segments 20a to 20d are generated based on top coordinates determined from image portions of faces.

Figure 3B:
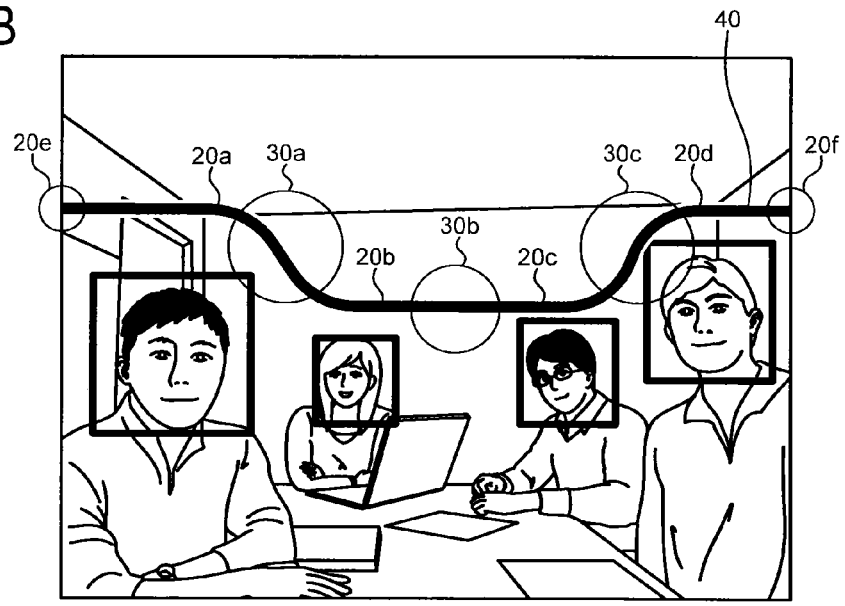

Subsequently, as illustrated in FIG. 3B, the top-boundary defining unit 120 generates a line by connecting between the generated horizontal line segments 20a to 20d each with a smooth curve, and stores coordinates of the generated curves. Examples of method for generating the smooth curves include a method using a sigmoid function and a method using a Bezier curve. A curve 30a connects between the horizontal line segment 20a and the horizontal line segment 20b. A curve 30b connects between the horizontal line segment 20b and the horizontal line segment 20c. A curve 30c connects between the horizontal line segment 20c and the horizontal line segment 20d. Meanwhile, there is no horizontal line segment to be connected in an area on the left side of the horizontal line segment 20a and an area on the right side of the horizontal line segment 20d. Accordingly, each of a horizontal line segment 20e and a horizontal line segment 20f is generated by extending a corresponding one of the horizontal line segment 20a and the horizontal line segment 20d to an image edge that depends on resolution. The method for generating the curves can be implemented by, for example, generating a sigmoid curve using a function y=arctan(x) for (−5<x<5), and enlarging or reducing the curve so as to pass through the coordinates.

Figure 3C:

As illustrated in FIG. 3C, the image converting unit 130 performs image conversion of stretching the image in a manner to locate a top boundary line 40 made up of the generated horizontal line segments 20a to 20f and the curves 30a to 30c on a top end of a resultant image. This image conversion is performed by generating a conversion table for converting coordinates T(X, Y) of a not-yet-converted original image to coordinates T(x, y) of a converted image, and re-positioning pixel values according to the table. Accordingly, pixels to be converted are only pixels at positions below the top boundary line 40, and pixels above the top boundary line 40 are deleted.

Image portions below the horizontal line segments 20a to 20f remain the same in visual impression before and after the conversion because a same enlargement ratio is applied to pixels in the image portions. By contrast, image portions below the curves 30a to 30c can vary in the distance between the top boundary line 40 and a top end of the image portion with an x coordinate. In that case, enlargement ratios can vary such that although a large enlargement ratio is applied to one pixel, a small enlargement ratio is applied to another pixel. Such variation between enlargement ratios undesirably makes the converted image to differ from the original image in geometry. However, the image portions below the curves 30a to 30c do not contain a face, a visual change at which is easily noticeable. Accordingly, a user is less likely to find the image portions unnatural. For example, a portion near a shoulder of a person second from the right in FIG. 3C is deformed in geometry by the conversion; however, this deformation gives less impression of being visually unnatural when compared with deformation of a face.

The conversion is concretely described below with reference to FIGS. 4A to 4C. FIGS. 4A(a) and 4B(a) are diagrams illustrating coordinates of a not-yet-enlarged image. FIGS. 4A(b) and 4B(b) are diagrams illustrating coordinates of an enlarged image. Meanwhile, f(X) is a function that describes the top boundary line 40; the value of X determines the value of Y.

Referring to FIGS. 4A(a) to 4B(b), y coordinates in the enlarged image are calculated from Equation (1) below.

$$y = Y \frac{h}{f(X)} \quad (1)$$

In Equation (1), a y coordinate in the enlarged image is calculated from a ratio between h, which depends on vertical resolution of the image, and f(X), which is a Y coordinate determined by an X coordinate.

A method for calculating x coordinates in the enlarged image is described below with reference to FIGS. 4B(a) and 4B(b). Image enlargement ratios obtained during calculation of the y coordinates are used in calculation of the x coordinates. More specifically, an x coordinate is calculated based on a ratio between h, which is a height of the image, and f(Y). The x coordinates calculated in this way can be expressed by Equation (2) below.

$$x = \int_0^x \frac{h}{f(t)} dt \quad (2)$$

A list of coordinates assigned to pixels (hereinafter, "pre-enlargement pixels") in the not-yet-enlarged image and pixels (hereinafter, "post-enlargement pixels") in the enlarged image is obtained in this way. The pre-enlargement coordinates and the post-enlargement coordinates related to each other are stored in a table form as illustrated in FIG. 4C. The table presents the relationship between post-enlargement x coordinates and pre-enlargement X coordinates. Referring to the table, for example, for x=1, the pre-enlargement X coordinate is 0.5. The pre-enlargement X coordinate values can be obtained from the post-enlargement x coordinates by using a function T1(x, y) based on this relationship. Accordingly, pixel values of pixels to be plotted as an enlarged image can be obtained from a not-yet-enlarged image. Specific examples of a method for calculating the function T1(x, y) include performing numerical calculation of Equation (2) described above using a finite difference method or the like, thereby mapping x to X and y to Y. In practice, the function T1(x, y) allows obtaining the pre-enlargement X coordinates from values of x independent of values of y. Similarly, the pre-enlargement Y coordinates can be obtained from a function T2(x, y) expressed by Equation (3) below.

$$\therefore Y = T2(x, y) = \frac{yf(X)}{h} = \frac{yf(T1(x, y))}{h} \quad (3)$$

The function T2(x, y) allows obtaining y coordinates by reverse calculation using ratios between the function f(X) that describes the top boundary line 40, and the height h. The values of X can be calculated from the function T1(x, y) described above.

The output control unit 140 performs output control for causing the display apparatus 300 to display the image having been enlarged as described above. Examples of the output control include resizing the image according to a resolution of the display apparatus 300 and adjusting a position where the image is to be displayed on a screen. For instance, when an image size of the enlarged image is 250 pixels in width and 100 pixels in height and the resolution of the display apparatus 300 is 960×540 pixels, the image is enlarged with reference to the width of the image. As a result, empty space is created above and below the image.

Figure 5:
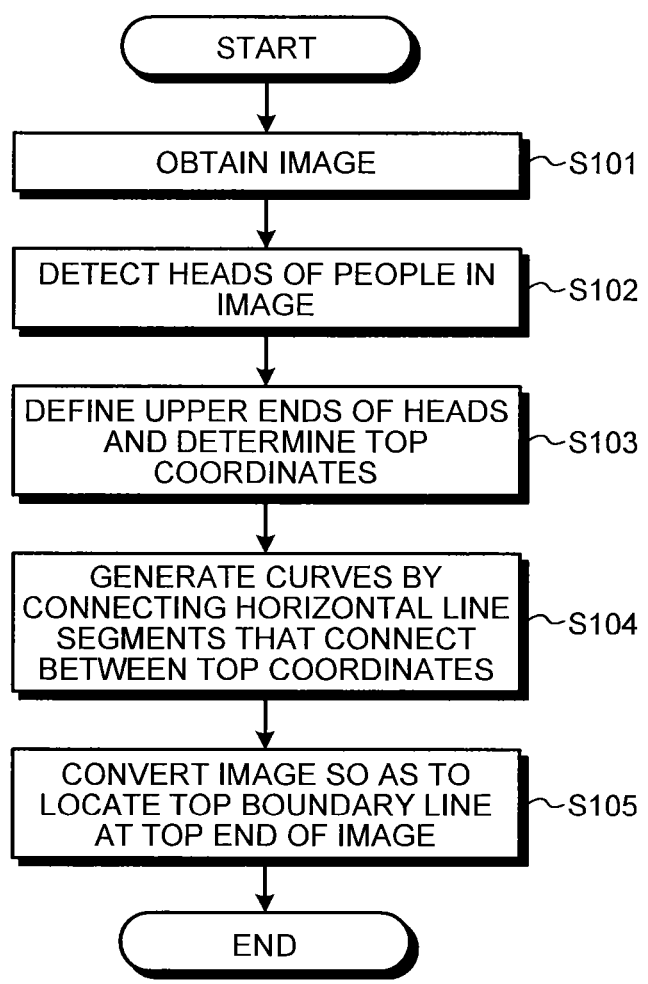
FIG. 5 is a flow diagram illustrating image conversion steps to be carried out by the image processing apparatus according to the embodiment.

Steps to be carried out by the image processing apparatus 100 described above are described below with reference to FIG. 5. FIG. 5 illustrates the steps, in which each time image data is obtained by image capturing, image enlargement is performed. As illustrated in FIG. 5, the image processing apparatus 100 obtains image data captured by the image capturing unit 200 first (Step S101). Subsequently, the people detecting unit 110 detects faces of people in the obtained image data (Step S102). Subsequently, the top-boundary defining unit 120 defines upper end positions of the faces and determines top coordinates (Step S103). Subsequently, the top-boundary defining unit 120 generates the horizontal line segments 20a to 20d by connecting the determined top coordinates and connects between the horizontal line segments 20a to 20d with the curves 30a to 30c (Step S104). The image converting unit 130 converts the image in a manner to locate the top boundary line 40 at a top end of a resultant image (Step S105).

The image processing apparatus 100 described above applies a same enlargement ratio to every pixel in image portions corresponding to faces of an image. Accordingly, even when the image is enlarged, the faces are not deformed. Accordingly, it becomes possible to appropriately enlarge a plurality of people in an image without causing the enlarged image to give unnatural impression to a user. Furthermore, the horizontal line segments 20a to 20d are connected with the smooth curves 30a-30c in image portions where no face is present. Accordingly, sharp difference in enlargement ratio between neighboring pixels is smoothed, and unnatural impression given by image deformation can be minimized.

Each of the horizontal line segments 20a to 20d is slightly longer than an actual lateral width of a corresponding one of the faces. Accordingly, a same enlargement ratio is applied to an image portion of a body portion adjacent to the face and to the image portion of the face. As a result, unnatural impression that would otherwise be given by deformation of the body portion adjacent to the face can be prevented.

Modifications

Figure 6A:
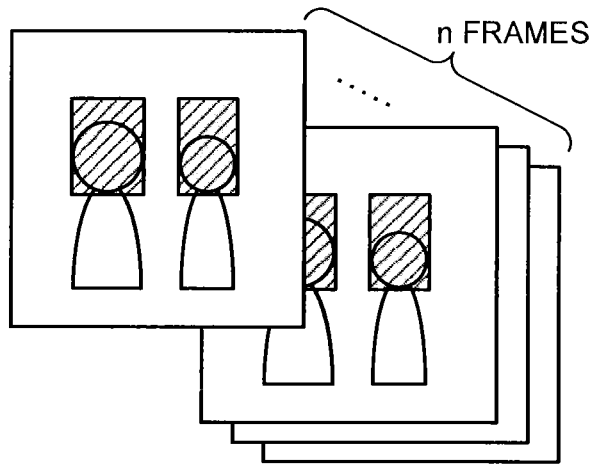
FIGS. 6A, 6B, and 6C are diagrams for describing extraction of faces from a plurality of frames according to a first modification of the embodiment.
Figure 6B:
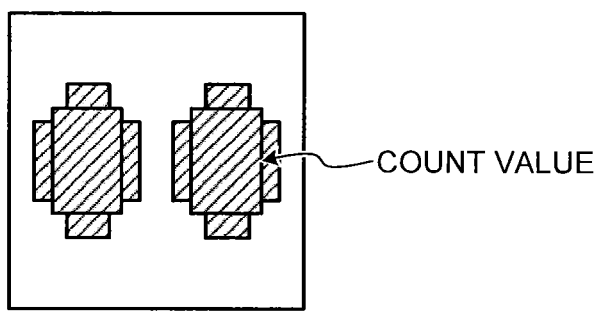
Figure 6C:
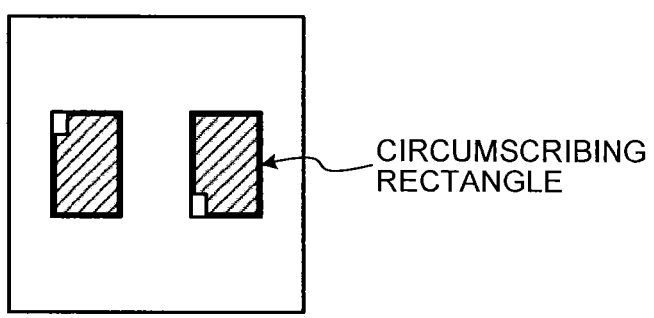
Figure 7:
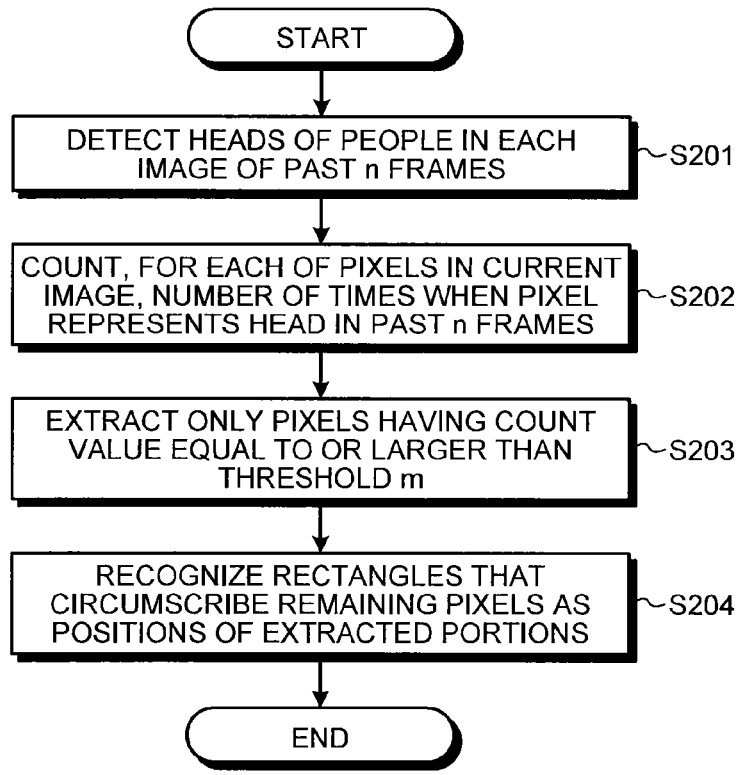
FIG. 7 is a flow diagram illustrating face extraction steps according to the first modification of the embodiment.

Modifications of the embodiment are described below. In a first modification, which is an example of the modification, a top boundary line is not generated each time an image is obtained. Rather, a top boundary line is generated based on positions of faces of people detected during a predetermined period, and images are converted based on the thus generated top boundary line during a preset period of time. The first modification is described below with reference to FIGS. 6A to 6C and FIG. 7. As illustrated in FIG. 6A and FIG. 7, the people detecting unit 110 detects faces of people in each image of past n (n is a positive integer) frames and a current image (Step S201). As illustrated in FIG. 6B and FIG. 7, the people detecting unit 110 then counts, for each of pixels in the current image, the number of times the pixel represents the faces in the past n frames (Step S202). The people detecting unit 110 extracts only pixels having the count value that is equal to or larger than a threshold m (m is a positive integer) (Step S203). As illustrated in FIG. 6C and FIG. 7, the people detecting unit 110 connects the extracted pixels to extract circumscribing rectangles, and recognizes the circumscribing rectangles as positions of the faces of the people (Step S204).

The positions of the faces are generated in this manner. Subsequently, positions of a top boundary line are determined based on the face positions, and enlargement is performed. In the first modification, face positions at a certain point in time are determined based on positions of the faces in n frames preceding a frame of the certain point in time. Therefore, even when a face makes a large motion, the motion is averaged. Accordingly, problems such as an abrupt change in the enlargement ratio applied to an image portion of a face and undesirable positional shift of a face can be lessened.

Figure 8:
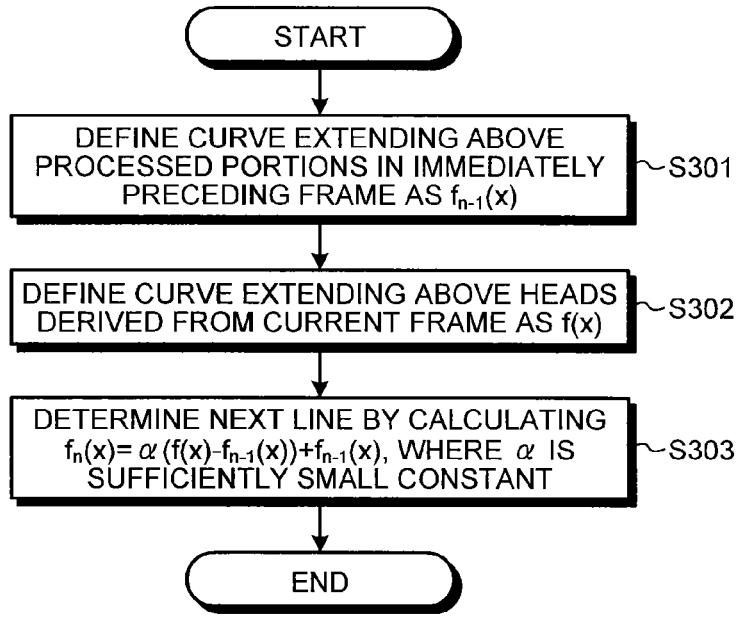
FIG. 8 is a flow diagram illustrating steps for generating a top boundary line according to a second modification of the embodiment.
Figure 9A:
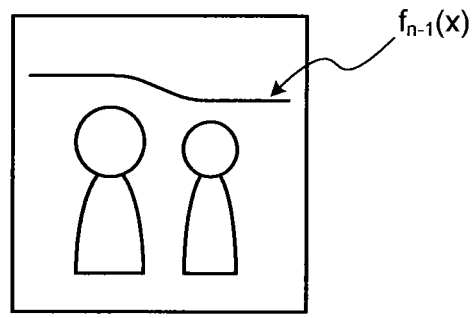
FIGS. 9A, 9B, and 9C are diagram for describing the steps for generating a top boundary line according to the second modification of the embodiment.
Figure 9B:
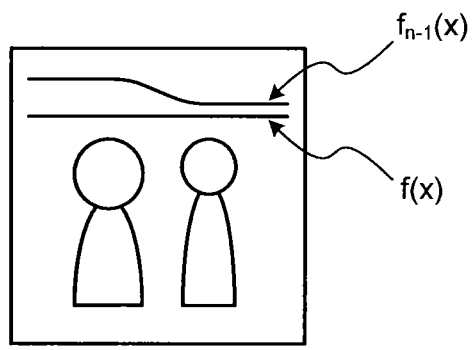
Figure 9C:
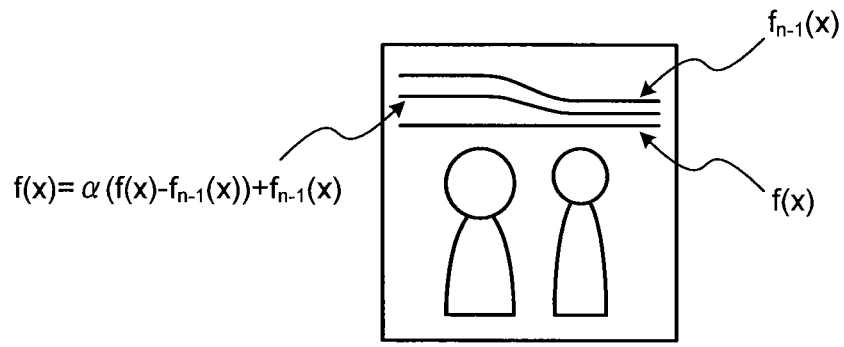

A second modification is described with reference to FIG. 8. and FIGS. 9A to 9C. In the second modification, a top boundary line is generated based on a top boundary line in a current frame and a top boundary line in an immediately preceding frame rather than only based on the top boundary line in the current frame. As illustrated in FIG. 8 and FIG. 9A, the top-boundary defining unit 120 obtains $f_{n-1}(x)$, which is a top boundary line extending above faces extracted from an immediately preceding frame (Step S301). Subsequently, as illustrated in FIG. 8 and FIG. 9B, the top-boundary defining unit 120 obtains f(x), which is a top boundary line extending above faces extracted from the current frame (Step S302). The top-boundary defining unit 120 obtains a top boundary line calculated from $f_n(x)=\alpha(f(x)-f_{n-1}(x))+f_{n-1}(x)$ as illustrated in FIG. 8 and FIG. 9C by combining the top boundary line in the immediately preceding frame and the top boundary line in the current frame (Step S303). Meanwhile, $\alpha$ is a sufficiently small constant. Enlargement is performed using the thus calculated top boundary line $f_n(x)$.

Using the top boundary line calculated as described above allows, even when a face makes a large motion, lessening an abrupt change in the enlargement ratio.

As a third modification, an approach of performing enlargement after trimming a right area and/or a left area containing no person from an image can be employed. The third modification is effective when applied to a situation where, for instance, lateral enlargement is limited by resolution of a display or the like. When an enlargement ratio calculated based on the top boundary line is larger than a lateral enlargement ratio permitted by the resolution, an image may be enlarged insufficiently. This is because actual enlargement is performed in the lateral enlargement ratio. However, trimming an area(s) where no person is photographed from the image allows enlargement in a larger enlargement ratio. The third modification is described below with reference to FIG. 10 and FIGS. 11A to 11C.

Figure 10:
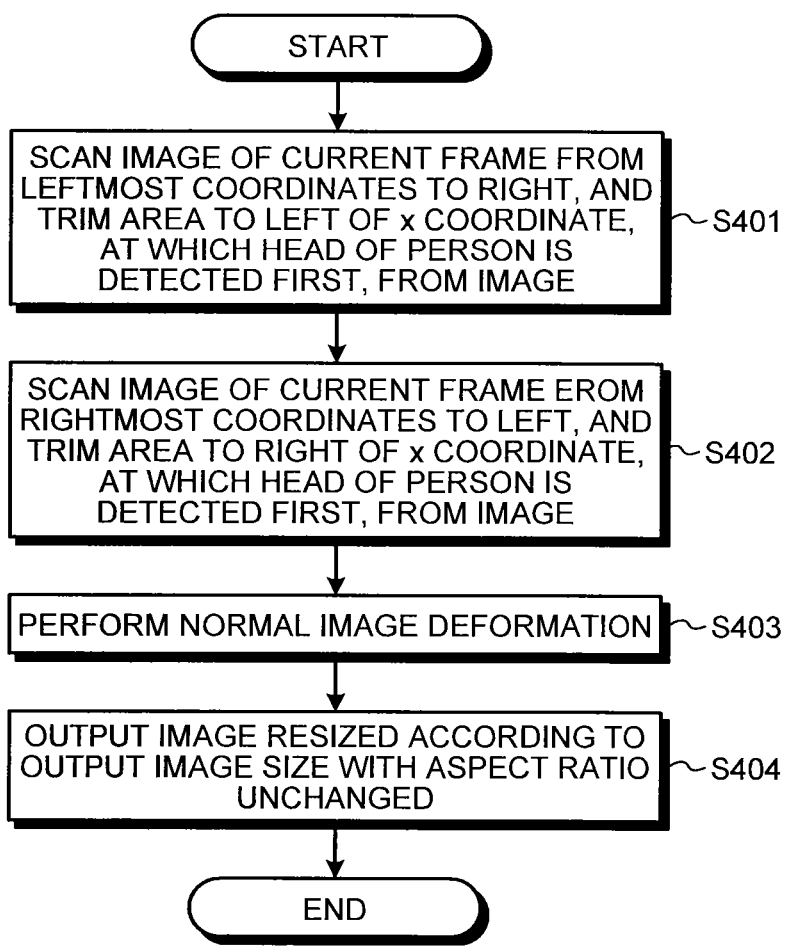
FIG. 10 is a flow diagram illustrating steps for trimming left and right areas from an image and enlarging the trimmed image according to a third modification of the embodiment.
Figure 11A:
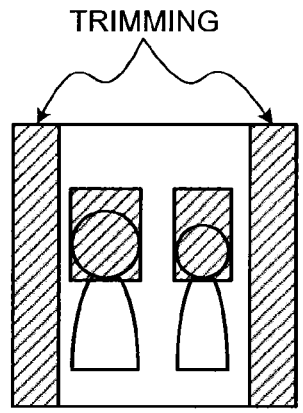
FIGS. 11A, 11B, and 11C are diagrams for describing the steps for trimming left and right areas from an image and enlarging the trimmed image according to the third modification of the embodiment.
Figure 11B:
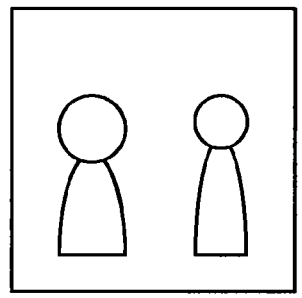
Figure 11C:
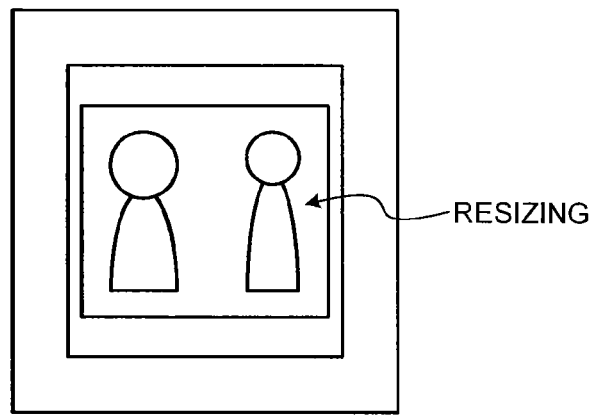

As illustrated in FIGS. 10 to 11C, the image converting unit 130 scans an image of a current frame from leftmost coordinates to the right, and trims an area to the left of an x coordinate, at which a face of a person is detected first, from the image (Step S401). Subsequently, the image converting unit 130 similarly scans the image of the current frame from rightmost coordinates to the left, and trims an area to the right of an x coordinate, at which a face of a person is detected first, from the image (Step S402). As illustrated in FIG. 11B, the image converting unit 130 enlarges the image, from which the right area and the left area are trimmed, in enlargement ratios calculated based on a top boundary line (Step S403). As illustrated in FIG. 11C, finally, the output control unit 140 performs resizing according to the resolution of the display apparatus 300, from which the image is to be output, while maintaining an aspect ratio of the image, and causes the display apparatus 300 to output the image (Step S404).

In the embodiment described above, the image processing apparatus 100 processes an image captured by the image capturing unit 200 connected to the image processing apparatus 100. Alternatively, the following configuration may be employed. For instance, there may be employed a configuration in which image processing apparatuses are connected to each other over a network, and one of the image processing apparatus processes an image transmitted from the other image processing apparatus. In this configuration, the image processing apparatuses may be connected directly to each other or via a server. When the image processing apparatuses are connected via a server, processing may be performed by the server having the same function in lieu of the image processing apparatus.

The image processing apparatus according to the embodiment has a hardware configuration implemented by utilizing a typical computer and includes a control device such as a central processing unit (CPU), a storage device such as a read only memory (ROM) and a random access memory (RAM), an external storage device such as a hard disk drive (HDD) and/or a compact disc (CD) drive, a display device, and an input device such as a keyboard and/or a mouse.

Program instructions to be executed by the image processing apparatus according to the embodiment are provided as being recorded in a non-transitory tangible computer-readable storage medium as a file in an installable format or an executable format. The non-transitory tangible computer-readable storage medium can be a compact disk read only memory (CD-ROM), a flexible disk (FD), a compact disk recordable (CD-R), a digital versatile disk (DVD), or the like.

The program instructions to be executed by the image processing apparatus according to the embodiment may be configured to be stored in a computer connected to a network such as the Internet and provided by downloading over the network. The program instructions to be executed by the image processing apparatus according to the embodiment may be configured to be provided or distributed over a network such as the Internet. The program instructions to be executed by the image processing apparatus according to the embodiment may be configured to be provided as being stored in a ROM or the like in advance.

The program instructions to be executed by the image processing apparatus according to the embodiment have a module structure including the units described above. From the viewpoint of actual hardware, the CPU (processor) reads out the program instructions from the storage medium and executes the program instructions to load the units into the main storage device, thereby generating the units on the main storage device.

An aspect of the present invention is advantageous in that it enables enlarging a plurality of people appropriately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
processing circuitry configured to
perform a people detecting process that detects image portions of faces of a plurality of people in an image;
perform a lateral line generating process that determines top coordinates based on upper end positions of pixels that represent the detected faces, and generates a lateral line extending in horizontal direction from the top coordinates on a person-by-person basis of the people, and
perform an image converting process that enlarges a portion below the lateral line of the image in a manner to locate the lateral line at a top end of the image,
the processing circuitry being further configured to connect between the lateral lines each with a curve to generate a continuous top boundary line, the top boundary line including the lateral lines and the curve, and
the processing circuitry enlarges a portion below the top boundary line of the image in a manner that locates the top boundary line at the top end of the enlarged image.

2. The image processing system according to claim 1, wherein
the processing circuitry continuously detects the faces of the people in a first period, counts, for each of pixels of the image, number of times when the pixel is recognized as the faces, and recognizes each pixel detected as the faces a preset threshold number of times or more as the faces, and the processing circuitry generates the top boundary line based on coordinates of top pixels of the pixels recognized as the faces.

3. The image processing system according to claim 1, wherein the processing circuitry generates the top boundary line by combining a top boundary line generated based on the faces of the people in a current frame and a top boundary line generated based on the faces of the people in a frame preceding the current frame.

4. The image processing system according to claim 1, wherein when no face of the people is present in any one or both of a right area and a left area of the image, the processing circuitry trims the one or both of the areas from the image.

5. The image processing system according to claim 1, wherein the processing circuitry detects the faces based on any one or a combination of color information, motion information, and texture information about the image.

6. A non-transitory computer-readable medium storing program codes that cause, when executed by a computer, the computer to perform a method comprising:
   detecting image portions of faces of a plurality of people in an image;
   performing a lateral line generating process that determines top coordinates based on upper end positions of pixels that represent the detected faces, and generating a lateral line extending in horizontal direction from the top coordinates on a person-by-person basis of the people;
   performing an image converting process that enlarges a portion below the lateral line of the image in a manner to locate the lateral line at a top end of the image;
   connecting between the lateral lines each with a curve to generate a continuous top boundary line, the top boundary line including the lateral lines and the curve, and
   enlarging a portion below the top boundary line of the image in a manner that locates the top boundary line at the top end of the enlarged image.

7. A method, implemented by an image processing system, comprising:
   detecting image portions of faces of a plurality of people in an image;
   performing a lateral line generating process that determines top coordinates based on upper end positions of pixels that represent the detected faces, and generating a lateral line extending in horizontal direction from the top coordinates on a person-by-person basis of the people;
   performing an image converting process that enlarges a portion below the lateral line of the image in a manner to locate the lateral line at a top end of the image;
   connecting between the lateral lines each with a curve to generate a continuous top boundary line, the top boundary line including the lateral lines and the curve, and
   enlarging a portion below the top boundary line of the image in a manner that locates the top boundary line at the top end of the enlarged image.

8. The method according to claim 7, further comprising:
   continuously detecting the faces of the people in a first period, counting, for each of pixels of the image, a number of times when the pixel is recognized as the faces, and recognizing each pixel detected as the faces a preset threshold number of times or more as the faces, and
   and generating the top boundary line based on coordinates of top pixels of the pixels recognized as the faces.

9. The method according to claim 7, further comprising:
   generating the top boundary line by combining a top boundary line generated based on the faces of the people in a current frame and a top boundary line generated based on the faces of the people in a frame preceding the current frame.

10. The method according to claim 7, wherein when no face of the people is present in any one or both of a right area and a left area of the image, trimming the one or both of the areas from the image.

11. The method according to claim 7, further comprising:
   detecting the faces based on any one or a combination of color information, motion information, and texture information about the image.

\* \* \* \* \*